Sept. 7, 1948.  S. SHAFFER  2,449,014

CONTAINER CLOSURE

Filed June 13, 1946

INVENTOR
Stewart Shaffer
BY
Brown, McCallister & Miller
His ATTORNEYS

Patented Sept. 7, 1948

2,449,014

UNITED STATES PATENT OFFICE 2,449,014

CONTAINER CLOSURE

Stewart Shaffer, Muncie, Ind., assignor to Ball Brothers Company, a corporation of Indiana Application June 13, 1946, Serial No. 676,447

9 Claims. (Cl. 215—56)

This invention relates to closures, and more particularly, to closures for containers such as employed in fruit and vegetable packs. A phase of my invention pertains to closures suitable for vacuum packs.

In canning in accordance with the vacuum pack process, it is customary to place the food in containers and somewhat loosely fit a lid on such containers before the contents are heated or cooked, for example, it may be tightened down and given a half or quarter turn back. The somewhat loose fit permits the release of fluid pressure during the first or cooking operation. After the completion of the heat processing, a vaccum is produced therein as the contents are cooled in accordance with the second step of the operation. As a result, the mechanical clamping down of the lid is supplemented by atmospheric pressure, provided that the sealing edge of the lid forms an accurate fit with the lip edge of the container. Particularly where the lid is of two-part construction, the sealing disc or liner of the lid should not be improperly distorted when it is tightened down. This has been difficult to control in prior constructions.

I have found that some food particles, syrups, and juices tend to be carried out and around the inside of the lid during the first or pressure operation. Since the screw band or lid retainer should not be removed between the first and second steps, such food particles and syrups tend to corrode the screw band, spoil, or mold and thus, in addition to presenting an unsightly and unsanitary appearance, make it very difficult to later remove the screw band when the contents of the container are to be used.

And, it has been an object of my invention to provide a new and improved closure, and particularly, a two-part closure.

Another object has been to devise a closure arrangement that will be inexpensive to produce, but that will overcome the disadvantageous features of prior constructions.

Another object has been to devise a closure that will provide a fluid-tight seal, but that has sufficient flexibility to relieve excess vapor pressure in a container without spoiling the seal.

A further object of my invention has been to provide a closure from which food particles and juices may be washed out without releasing the sealing action thereof.

A still further object has been to provide a closure having an improved flexibility between the sealing-down and threaded portions thereof and which will not objectionably distort when tightened down on lugs or screw threads of the container.

These and many other objects of my invention will appear to those skilled in the art from the embodiment thereof chosen for the purpose of illustration.

Figure 1:
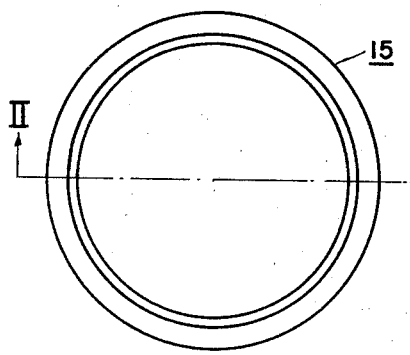
Figure 1 is a top plan view of an inside or liner lid of a closure illustrating an embodiment of my invention.

Referring to the illustrated example of my invention shown in Figures 1 to 5, inclusive, a container or jar 10 of a suitable material such as glass or plastic is shown provided with a side-projecting annular limit or stop flange 11, screw threads or continuous outwardly projecting side lugs 12, and a lip edge 13. My preferred form of closure or cap is of two-part metal construction (although other suitable materials may be employed), comprising an inner element, liner or lid 15 which is adapted to rest upon the lip edge 13 of the container, and an outer, adjustable, clamping or screw-threaded retainer band element 20 which is adapted to interlock with threads or lugs 12 of the container. The retainer element 20 is adapted to receive the liner 15 to guide and hold it in a seated relationship with respect to the lip edge 13.

Figure 2:
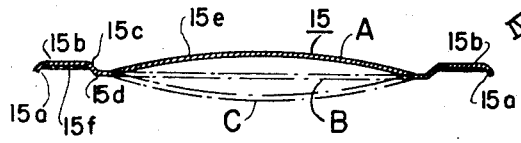
Figure 2 is a sectional view in elevation taken along the line II—II of Figure 1.
Figure 3:
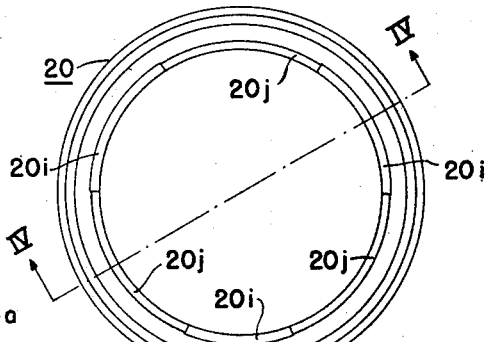
Figure 3 is a bottom plan view of an outside retainer element or positioning cap of the closure illustrating my invention.

The liner or sealing lid part 15 of somewhat disc-like shape is provided with a continuous or annular rim portion 15b, corresponding somewhat to the contour of the lip edge 13 and having a pair of spaced-depending-sloped inner and outer depending edge portions 15a and 15c that serve to position it on the lip edge 13. The rim portion 15b extends substantially transversely of the opening in the container and the inner depending portion 15c is connected by an annular grooved portion 15d to an outwardly convex body portion 15e which extends transversely across the container opening and slopes upwardly from the portion 15d to provide a dome-shaped center. The inner face of the rim portion 15b may be provided with a flowed-in gasket 15f, or if desired, with a separately formed ring or gasket of a suitable resilient sealing material such as rubber, composition, or plastic. The center body portion 15e of the lid, as shown particularly in Figure 2, is preferably preformed into an upwardly convex or dome shape and is of flexible construction, in order that it may pivot about the depressed or grooved connecting portion 15d to move from position A to positions B or C, as will be more specifically pointed out hereafter. I also preferably coat or bake the inner face portions or side of the liner 15 with some suitable protective material such as an enamel or plastic which will be relatively inert or non-sensitive to acid or alkali contents of food to be stored.

Figure 4:
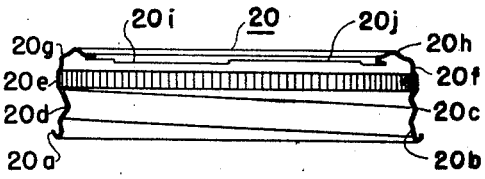
Figure 4 is a side sectional view in elevation taken along the line IV—IV of Figure 3.
Figures 5, 6:
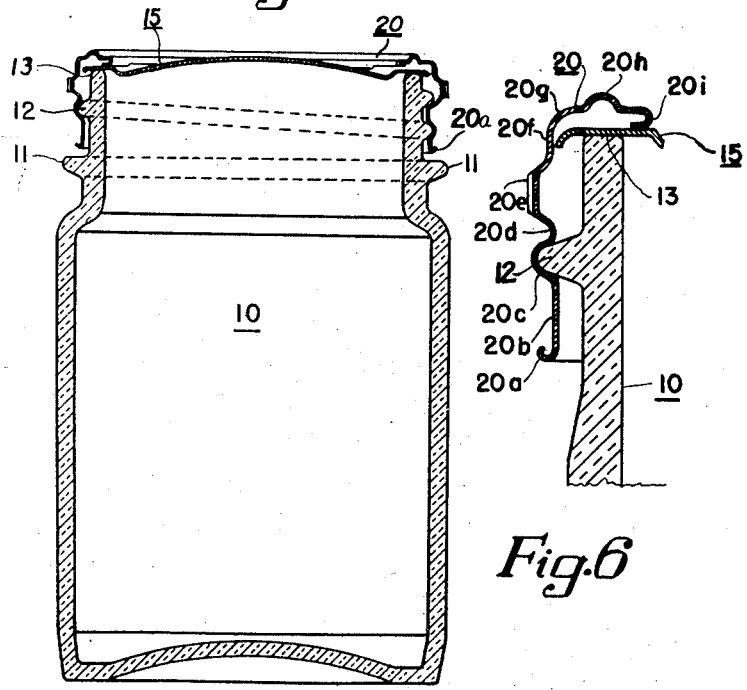
Figure 5 is a side section view in elevation showing inside and outside closure parts of Figures 1 and 3 in an assembled relation on a container and is, in effect, taken along the line IV—IV of Figure 3.
Figure 6 is an enlarged fragmentary section in elevation taken from the left of Figure 5 and showing the illustrated closure assembly of my invention in a fully closed relationship on a container; in this view the conventional annulus 11, see Figure 5, has been omitted.

The retainer element 20, as shown particularly in Figures 3, 4, 5 and 6, comprises depending skirt or apron portions 20a, 20b, 20c, 20d, 20e, and 20f which extend somewhat vertically or lengthwise of the container and top portions 20g, 20h and 20i which extend substantially horizontally or transversely of the container opening. As shown particularly in Figure 5, the extending upturned or beaded flange portion 20a terminates a short distance from the stop annulus 11 of the container 10 when the closure is tightened down on the container. As shown in Figure 6, the annulus 11 may be omitted entirely when a closure of my invention is used.

The portions 20b, 20c and 20d are offset, corrugated or alternately convexed and concaved to correspond to the threads or lugs 12 of the container in order that the retainer element 20 may be screw threaded or adjustably secured thereon. It will be noted that the annular knurled portion 20e, which provides a hand turn grip, is formed in such a manner that it terminates above the end of the threads 12 of the container and also is so constructed that its inner diameter is greater or at least not less than the outside diameter of the threads or lugs 12 of the container or of the inside diameter of the portion 20c of the skirt flange of the retainer element 20. It will thus be apparent that when the part 20 is screwed down on the container that the knurled portion 20e will be free of or will not bind on the projections or threads 12 of the container. The knurled portion 20e is connected to a top rim or flange by a smoothly sloped flexible extension portion 20f which with the step portion 20g, in effect, acts as a guide or centering abutment for the outer edge portion 15a of the liner, since as shown, the spacing between depending edges 15a and 15d may be greater than the width dimension of the lip edge 13.

The somewhat convex, substantially continuous rim ridge portion 20h is connected to the inner flange portion 20i which is provided with an inwardly turned up spaced or beaded edge, see particularly Figures 4, 5 and 6. It is thus apparent that the rim-engaging flange portion extends inwardly and under the top or transverse rim portion of the retainer element in a spaced-apart flexible relationship therewith. The bead provided by the flange portion engages the lid entirely inside and adjacent to a longitudinal plane of an inner side wall of the lip edge of the container opening. The whole is thus constructed and arranged in such a manner that the lid is free to tilt between the flange portion of the retainer element and the lip edge of the container when the retainer element is tightened down on the container. In accordance with this construction, the portions 20f, 20g and 20h provide a flexible lever action when the element 20 is screwed down tightly on the container to permit a release of internal fluid pressure about the rim seat 15f when it becomes too great within the container. It will also be noted that the liner 15 is clear of the knurled portion 20e. This construction provides a better centering of the lid 15 and prevents the retainer element 20 from being screwed down cross-threaded on the container thread. That is, the lid 15 is free to seek a properly centered position on the lip edge 13 of the container as well as a proper relationship with respect to the retainer element 20. The edge extremities of the lid 15 cannot be locked under compression by reason of tight abutment with an inside wall of the knurled portion 20e; and, the old difficulty of obtaining a suitable alignment of the retainer element to prevent cross-threading when screwing it down on the threads of the container has been eliminated. As a result, I have also been able to provide a retainer 20 that will have a much shorter apron or skirt length than in previous constructions, wherein the liner abuts the knurled portion, and the knurled portion, by reason of its small diameter and close location to the top of the retainer element, is in abutment with edges of the liner and at its lower edges will be in abutment with the topmost edges of the thread projections of the container. The practice of centering the lid or liner within the knurled area is objectionable due to the fact that this area is of smaller diameter than the outside diameter of threads of the container with the result that such area contacts the container thread at the top of its finish, forcing the retainer band 20 out of center with the threaded axis of the jar, and causing the retainer cap 20 to cock. Figure 6 is taken through a wall section of the container at the topmost limits of the threads thereof.

In the conventional construction, the inner edge which corresponds to the portion 20i of the present construction, is a continuous circular bead. As noted in Figure 6, an inner flange or wall of the bead 20i extends transversely-inwardly in a spaced-apart relationship with respect to an adjacent substantially transversely extending wall of the top portion of the retainer element 20. It will also be noted the spaced-apart walls forming the bead are connected by a flexible portion integral therewith. In accordance with my invention, the bead 20i is in effect interrupted periodically by offset portions 20j that may be produced by closing the spacing or bead of the portion 20i at spaced locations therealong, see Figure 4. Thus, steam or hot water may be circulated between the inside of the retainer band 20, the outside of the liner or lid 15 and outer surfaces of the container 10 out or in through the spacing between element 20 and threads 12, to flush out any food particles or syrup that may be expelled from the container during the first or pressure operation. This insures an easy removal of the cap 20 when the food contents of the container are to be used and avoids unsightly mold and corrosion of the lid.

Referring again to Figure 2, the flexible center portion or dome 15e of the lid is designed or formed in such a manner that it will normally move outwardly to the full line position A, but will move from position A to the positions B and C when vacuum is created within the container during the second step of the food processing operation. That is, atmospheric pressure tends to force the portion 15e downwardly, producing a pronounced snap as it moves from an outwardly convex to a concave position. It also serves as a warning if the seal is broken, as it will return to its natural position A; the sealing failure may be further indicated by pressing a finger against the center of the portion 15e.

As illustrated particularly in Figures 4, 5 and 6, I have lengthened portions 20f and 20g to provide a lever fulcrum or hinge at the top of the knurled portion 20e. I thus obtain a softer, more flexible spring action on the lid 15 and can have a tighter relationship between the element 20 and the container 10 during the operation of heating the container and its contents. This spring action provides a lower venting point during the pressure processing while still insuring good sealing characteristics of the liner 15. The lid or liner 15 and the retainer band 20 act as a spring loaded automatic valve which enables pressure to be released from the jar; it will automatically close to prevent the outside atmosphere from entering food contents of the container; the valve action will also tightly seal the container when the container and its contents are cooled to room temperature. In this connection, it will be noted that Figure 6 shows that the lower wall of the bead 20i engages the lid 15 entirely inside of a longitudinal or vertical plane representing an inner side wall of the lip edge 13 of the container opening.

It will be apparent to those skilled in the art that although I prefer to preform the flexible, fluid-pressure-sensitive center 15e of the lid so that its normal position is indicated as A, I may also form it so that its normal position is at B or C, depending on whether a vacuum or a positive pressure force is exerted by fluid of the container 10. If C is the initial position, it will move to positions B and A depending on the amount of the pressure force exerted within the container.

It will be apparent to those skilled in the art that my invention is not limited to the specific illustrated embodiment shown and that various substitutions, additions, and modifications may be made as to the illustrated embodiment without departing from the spirit and scope of the invention as indicated by the appended claims.

What I claim is:

1. A closure for an opening in a container comprising, a lid and a lid retainer element, said lid having a substantially continuous rim portion thereabout constructed and arranged to rest upon and closely abut a lip edge of the container opening, said retainer element being constructed and arranged to receive said lid therein, said retainer element having a portion constructed and arranged to engage the container adjacent the opening therein for holding said retainer element in position on the container, said retainer element having a top portion provided with a flange wall constructed and arranged to engage said lid entirely inside a longitudinal plane of an inner side wall of the lip edge of the container opening, said lid being of flexible metal construction, and cleaning fluid apertures provided between the outside of said lid and the outside of the container adjacent the lip edge thereof and the inside of said retainer element.

2. A closure for an opening in a container comprising, a lid, a retainer element having a depending side skirt constructed and arranged to engage wall portions of the container adjacent the opening therein, said retainer element having a rim connected to said depending skirt and extending substantially transversely of the opening of the container, said lid having a rim portion constructed and arranged to rest upon a lip edge of the opening in the container, the rim of said retainer element having a substantially continuous bead constructed and arranged to abut against and hold the rim portion of said lid on the lip edge of the container, said bead having at least a pair of spaced-apart portions inwardly offset with respect to the rim portion of said lid and constructed and arranged to by-pass washing-out fluid between the outside of said lid and the inside of said retainer element, the inside of said retainer element having a spaced relationship with respect to at least a portion of an edge of the rim portion of said lid for by-passing washing out fluid about the container adjacent its lip edge.

3. A closure for an opening in a container comprising, a lid and a lid retainer element, said lid having a substantially continuous rim portion thereabout constructed and arranged to rest upon and closely abut a lip edge of the container opening and having a body connected to said rim portion, said retainer element having a top portion extending over the rim portion of said lid and terminating in a bead, said bead having a flange wall extending transversely and in a spaced-apart relation with respect to the top portion of said retainer element to provide a transverse opening, the flange wall of said bead being constructed and connected to flexibly engage said lid adjacent the rim portion thereabout, said retainer element having a side skirt portion and a connecting portion between the top portion and the side skirt portion, the side skirt portion being constructed and arranged to removably and securely engage an outer wall portion of the container.

4. A closure for an opening in a container comprising, a lid, a retainer element having a depending side skirt constructed and arranged to engage wall portions of the container adjacent the opening therein, said retainer element having a rim connected to said depending skirt and extending substantially transversely of the opening of the container, said lid having a rim portion constructed and arranged to rest upon a lip edge of the opening in the container, the rim of said retainer element having a substantially continuous bead constructed and arranged to abut against and hold the rim portion of said lid on the lip edge of the container, said bead having at least a pair of spaced-apart portions inwardly offset with respect to the rim portion of said lid and constructed and arranged to by-pass washing-out fluid between the outside of said lid and the inside of said retainer element, the inside of said retainer element having a spaced relationship with respect to at least a portion of an edge of the rim portion of said lid for by-passing washing-out fluid about the container adjacent its lip edge, the rim portion of said lid having spaced-apart depending portions provided with a spacing greater than the thickness of the lip edge of the container, one of said depending portions being the rim edge of said lid.

5. A closure for an opening in a container comprising, a lid and a lid retainer element, said lid having a substantially continuous rim portion thereabout constructed and arranged to rest upon and closely abut a lip edge of the container opening and having a body connected to said rim portion, said retainer element having a top portion extending over the rim portion of said lid and terminating in a bead, said bead having a flange wall extending transversely and in a spaced-apart relation with respect to the top portion of said retainer element to provide a transverse opening, the flange wall of said bead being constructed and conected to flexibly engage said lid adjacent the rim portion thereabout, said retainer element having a side skirt portion and a connecting portion between the top portion and the side skirt portion, the side skirt portion being constructed and arranged to removably and securely engage an outer wall portion of the container, said lid body being of flexible construction and being sensitive to fluid pressure inside and outside the container, and the flange wall of said bead engaging said lid inside a longitudinal plane of an inner side wall of the lip edge of the container opening.

6. A closure for an opening in a container comprising, a lid and a lid retainer element, said lid having a substantially continuous rim portion thereabout constructed and arranged to rest upon and closely abut a lip edge of the container opening and having a body connected to said rim portion, said retainer element having a top portion extending over the rim portion of said lid and terminating in a bead, said bead having a flange wall extending transversely and in a spaced-apart relation with respect to the top portion of said retainer element to provide a transverse opening, the flange wall of said bead being constructed and connected to flexibly engage said lid adjacent the rim portion thereabout, said retainer element having a side skirt portion and a connecting portion between the top portion and the side skirt portion, the side skirt portion being constructed and arranged to removably and securely engage an outer wall portion of the container, the top portion and the connection portion of said retainer element being of flexible construction and having a spaced-apart relationship with respect to and about said lid and an outer wall of the container adjacent the lip edge thereof when said retainer element is in mounted engagement with the container.

7. A closure for an opening in a container comprising, a lid and a lid retainer element, said lid having a substantially continuous rim portion thereabout constructed and arranged to rest upon and closely abut a lip edge of the container opening and having a body connected to said rim portion, said retainer element having a top portion extending over the rim portion of said lid and terminating in a bead, said bead having a flange wall extending transversely and in a spaced-apart relation with respect to the top portion of said retainer element to provide a transverse opening, the flange wall of said bead being constructed and connected to flexibly engage said lid adjacent the rim portion thereabout, said retainer element having a side skirt portion and a connecting portion between the top portion and the side skirt portion, the side skirt portion being constructed and arranged to removably and securely engage an outer wall portion of the container, the top portion and the connection portion of said retainer element being of flexible construction and having a spaced-apart relationship with respect to and about said lid and an outer wall of the container adjacent the lip edge thereof when said retainer element is in mounted engagement with the container, the flange wall of said bead having spaced-apart offset portions with respect to and about said lid to provide fluid passageways with the spacing between said retainer element and said lid and the outer wall of the container adjacent the lip edge thereof.

8. A closure for an opening in a container comprising, a lid, a retainer element, said lid having a rim portion constructed and arranged to rest upon a lip edge of the opening in the container, said retainer element being constructed and arranged to receive said lid therein and having a side skirt portion constructed and arranged to engage the container adjacent the opening therein for holding said retainer element in position on the container, said retainer element having a transverse rim portion connected to the side skirt portion thereof and provided with a substantially continuous bead constructed and arranged to abut against and hold the rim portion of said lid on the lip edge of the container, said bead having spaced-apart portions offset with respect to the rim portion of said lid and constructed and arranged to by-pass washing-out fluid between the outside of said lid and the inside of said retainer element, the inside of said retainer element having a spaced relationship with respect to at least a portion of an outer edge of the rim portion of said lid and with respect to outer walls of the container adjacent the lip edge thereof for by-passing washing-out fluid about the container.

9. A closure for an opening in a container comprising, a lid of flexible metal construction, said lid having a substantially continuous rim portion thereabout constructed and arranged to rest upon and closely abut a lip edge of the container opening, said lip being provided with spaced-apart depending portions on opposite sides and about the continuous rim portion thereof and located in a spaced relationship with respect to opposite sides of the lip edge of the container, said retainer element being constructed and arranged to receive said lid therein, said retainer element having a side skirt portion constructed and arranged to adjustably engage the container adjacent the opening therein for tightening said retainer element down on the container, said retainer element having a transverse rim portion connected to the side portion thereof and projecting toward the opening of the container, the side portion of said retainer element adjacent the transverse rim portion thereof having a spaced-apart relationship with respect to an outer peripheral edge of said lid when said lid and retainer element are in a mounted relationship with respect to the container, the transverse rim portion of said retainer element having a substantially continuous ridge portion located substantially centrally thereof for imparting flexibility thereto, the transverse rim portion of said retainer element having a rim-engaging flange portion that extends inwardly and thereunder to provide a bead, said bead being in a spaced-apart flexible relationship with respect to the transverse rim portion such that the latter has a spaced-apart relationship with respect to said lid, and said bead being constructed and arranged to engage said lid entirely inside and adjacent to a longitudinal plane of an inner side wall of the lip edge of the container opening, and the whole being constructed and arranged in such a manner that said lid is free to tilt between the flange portion of said retainer element and the lip edge of the container when said retainer element is tightened down on the container.

STEWART SHAFFER.

REFERENCES CITED

The following references are of record in the file of this patent:

UNITED STATES PATENTS

| Number | Name | Date |
|---|---|---|
| 1,134,069 | White | Mar. 30, 1915 |
| 1,160,597 | Hammer | Nov. 16, 1915 |
| 1,186,274 | Brosius | June 6, 1916 |
| 1,237,640 | Hammer | Aug. 21, 1917 |
| 1,878,265 | Craz | Sept. 20, 1932 |
| 1,943,810 | Gibbs | Jan. 9, 1934 |
| 2,008,593 | Pedersen | July 16, 1935 |
| 2,105,031 | Enkur et al. | Jan. 11, 1938 |
| 2,194,004 | Bukolt | Mar. 19, 1940 |
| 2,270,729 | Geddes | Jan. 20, 1942 |
| 2,383,747 | Sharp | Aug. 28, 1945 |
| 2,387,955 | Tilson | Oct. 30, 1945 |